United States Patent

Iwamoto

Patent Number: 5,468,105
Date of Patent: Nov. 21, 1995

[54] CEILING INSERT

[76] Inventor: Minekazu Iwamoto, No. 34-7, Kamitakada 1-chome, Nakana-ku, Tokyo, Japan

[21] Appl. No.: 254,663

[22] Filed: Jun. 6, 1994

Related U.S. Application Data

[62] Division of Ser. No. 74,611, Jun. 11, 1993, abandoned.

[51] Int. Cl.[6] .............................. F16B 37/08; F16B 39/02
[52] U.S. Cl. ............................ 411/433; 411/82; 52/704
[58] Field of Search ............................ 411/82, 267, 433, 411/437, 253, 254, 255, 266, 281, 935; 52/787, 704

[56] References Cited

U.S. PATENT DOCUMENTS

| | | | |
|---|---|---|---|
| 1,736,240 | 11/1929 | Wyss | 411/433 X |
| 3,151,652 | 10/1964 | Zahodiakin | 411/267 |
| 3,151,653 | 10/1964 | Zahodiakin | 411/267 |
| 3,313,078 | 4/1967 | Rohe | 411/82 X |
| 3,339,609 | 9/1967 | Cushman | 411/82 |
| 3,504,723 | 4/1970 | Cushman et al. | 411/82 |
| 3,579,942 | 5/1971 | Cole | 52/787 |
| 4,341,053 | 7/1982 | Dettfurth et al. | 411/82 X |
| 4,509,308 | 4/1985 | Dettfurth et al. | 411/82 X |
| 4,974,888 | 12/1990 | Childers | 411/433 X |
| 5,106,251 | 4/1992 | Steinbach | 411/433 |
| 5,240,543 | 8/1993 | Fetterhoff et al. | 411/82 X |

FOREIGN PATENT DOCUMENTS

| | | | |
|---|---|---|---|
| 2750829 | 5/1979 | Germany | 411/82 |
| 3-272310 | 12/1991 | Japan | 411/82 |
| 624714 | 6/1949 | United Kingdom | 411/433 |

*Primary Examiner*—Rodney M. Lindsey
*Attorney, Agent, or Firm*—Jacobson, Price, Holman & Stern

[57] ABSTRACT

A tapered split nut with depressed by coil spring downward in a central hole of a outer cylinder body is installed so as it can move upward. A hanging bolt is inserted from the bottom while it is pushing said split nut up. Owing to the upward movement of the hanging bolt, the split nut moves downward due to a pushing movement with pressure by the coil spring, and the split nut engages with and bit the thread portion of the hanging bolt.

9 Claims, 5 Drawing Sheets

5,468,105

CEILING INSERT

This is a divisional of application Ser. No. 08/074,611, filed Jun. 11, 1993 which was abandoned upon the filing hereof.

BACKGROUND OF THE INVENTION (1) Field of the Invention

The present invention relates to a ceiling insert to which a hanging bolt or a hanging fittings can be simply and firmly mounted after a concrete is soldified. The ceiling insert is buried beforehand inside the concrete for a ceiling structure in a construction of concrete structure for buildings and the like.

(2) Prior art

The ceiling insert is a fittings which is buried when the concrete of a slab and a building frame is casted in building constructions inside a concrete forming a ceiling structure so as to enable a hanging bolt or other hanging fittings to be fixed with a screw later.

FIG. 12 is a vertical section showing a working condition of the conventional ceiling insert. The ceiling insert 52 buried beforehand inside the concrete 51 is provided with a female thread inside the insert. A hanging bolt 54 having male thread 55 was inserted into the female thread from the bottom and was fixed.

However, the screw fixing work of the hanging bolt 54 into the conventional ceiling insert 52 was done by placing the tip of male thread 55 of the hanging bolt 54 on the female thread 53 and by turning the hanging bolt 54 manually around its axis with pressure one by one. However, since the ceiling inserts 52 are buried and installed in a ceiling structure at about 900 mm interval lengthwise and crosswise, total number of the inserts is of numerous. Therefore, the mounting works of the hanging bolts 54 into the ceiling structure took much time, and had problems of having extremely bad working efficiency.

SUMMARY OF THE INVENTION

The present invention relates to a ceiling insert mountable easily, without turning a hanging nut from the bottom around axis, by installing a tapered split nut suppressed downward by a coil spring inside the outer cylinder body.

The first object of the present invention is to provide the ceiling insert in which a hanging nut can be simply and rapidly mounted.

The second object of the invention is to provide the ceiling insert in which the hanging nut can be mounted without turning around its axis and screwing in.

The third object of the invention is to provide the ceiling insert in which the hanging nut is mounted firmly and will not be disengaged and dropped by any chance after it is once installed.

The objects described above and other objects and novel features will be made obvious enoughly by referring to the following detailed explanation with reference to the attached drawings. However, the drawings are merely for explanations, and does not limit the scope of this invention.

DETAILED EXPLANATION OF THE INVENTION

Figure 1:
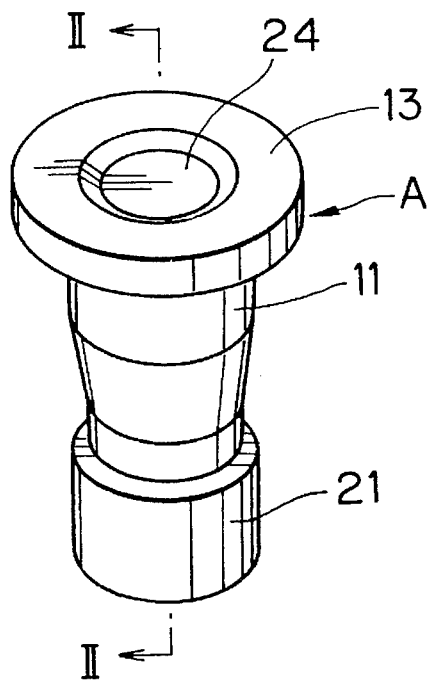
FIG. 1 depicts a perspective view of a ceiling insert of the present invention.
Figure 2:
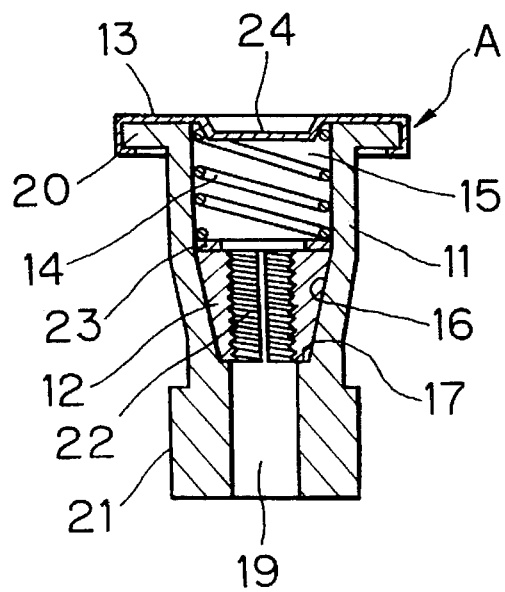
FIG. 2 depicts a cross section taken substantially along line II—II of FIG. 1.

The ceiling insert A of the present invention comprises the outer cylinder body 11, split nut 12 accommodated in the ceiling, lid body 13 covering and fixing the said outer cylinder body 11 from the top, and coil spring 14 accommodated in said outer cylinder body 11 above the split nut 12. All of the outer cylinder body 11, split nut 12 and lid body 13 are made of metal.

The outer cylinder body 11 comprises an upper hole 15 of large diameter accommodating the coil spring 14, and comprises a middle hole 16 under the upper hole 15. The middle or center hole 16 is tapered and the lower the levels in the hole is, the smaller the diameter becomes. The middle hole 16 is for accommodating the split nut 12. Further, the outer cylinder body 11 comprises a step portion 17 around the circumference of lower end of the center hole 16. The bottom portion of said split nut is mounted on the step portion 17. Furthermore, the outer cylinder body 11 comprises a lower hole 19 of small diameter under the step 17 for guiding the hanging bolt 18 when the bolt is inserted. A flange 20 is provided at the top of the outer cylinder body 11 for making the lid body 13 cover and fix the cylinder body easily. In addition, an bigger portion 21 is provided in the lower, outer circumference of the outer cylinder body 11.

The outside face of the split nut 12 is tapered so as to be able to contact the inside wall face of middle hole 16 of said outer cylinder body 11. Further, the split nut 12 is formed and provided with female thread 22 in its circumference wall face inside. The split nut 12 is inserted into the outer cylinder body 11 from the upper hole 15 of the outer cylinder body 11, and is mounted or placed on the step portion 17 provided at the circumference end of the middle hole 16. Then, a metal washer 23 is placed on or above the split nut 12, and the coil spring 14 is installed above the washer. The lid body 13 as a cover is fixed on the flange 20 of the outer cylinder body 11 by means of caulking and the like. The split nut 12 is energized downward by the lower face of lid body 13 contacting the upper end of coil spring 14 with pressure.

It is recommended to have a round depressed portion 24 engaging with the top end of said coil spring 14 in the downward direction of the central part of lid body 13. This depressed portion 24 is formed so that the lower face center of the lid body 13 is firmly engaged with the top of the coil spring 14, and is formed in order to hold the coil spring 14 in upright or vertical condition.

Figure 3:
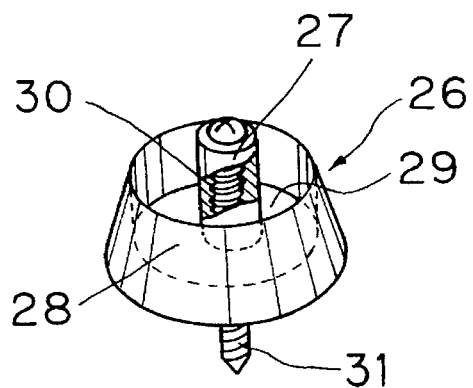
FIG. 3 depicts a perspective view partially broken away of supplimental member for mounting the ceiling insert by the insert on a molded frame member.

FIG. 3 is a perspective view partially broken away of supplimental member 26 having a desirable structure for mounting the ceiling insert A of the present invention on the molded frame member 25. The supplimental member 26 is formed by fixing the bottom plate 29 having a ring state protrusion for accepting the bigger portion 21 of the lower part of the outer cylinder body 11 at the bottom of a hollow tube 27. The hollow tube 27 is made of hard synthetic resin and has a diameter for engaging with the lower hole 19 of the outer cylinder body 11 of ceiling insert A. Further, the supplimental member 26 is formed by passing a screw 31 fixing the molded frame member through a through hole 30 of the hollow tube 27.

The mounting process of the ceiling insert A of the present invention for the molded frame material, using said supplimental member 26, will be described in reference to the FIG. 4 to FIG. 7.

Figure 4:
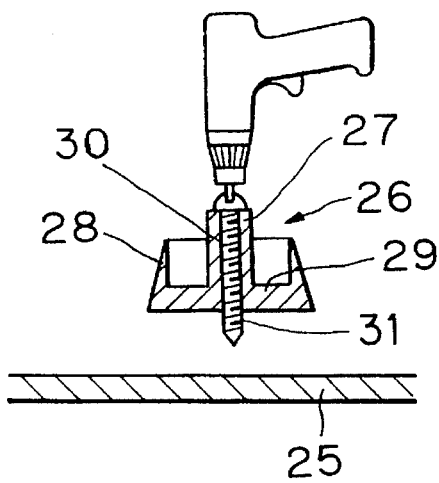
FIG. 4 to FIG. 7 are vertical sections showing process for burying the ceiling insert in the concrete structure.
Figure 5:
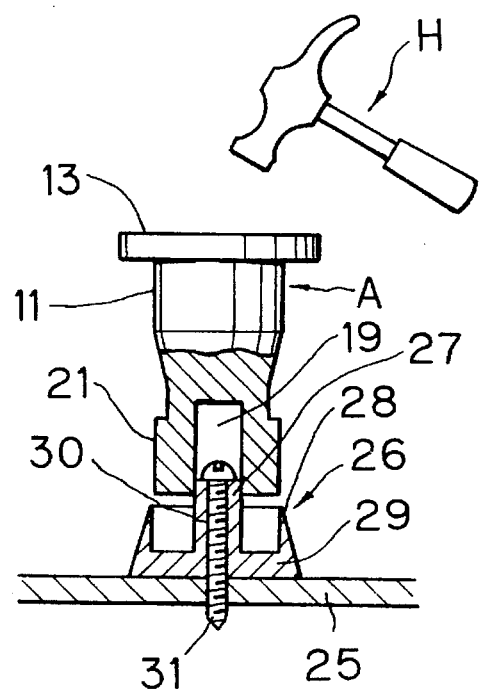
Figure 6:
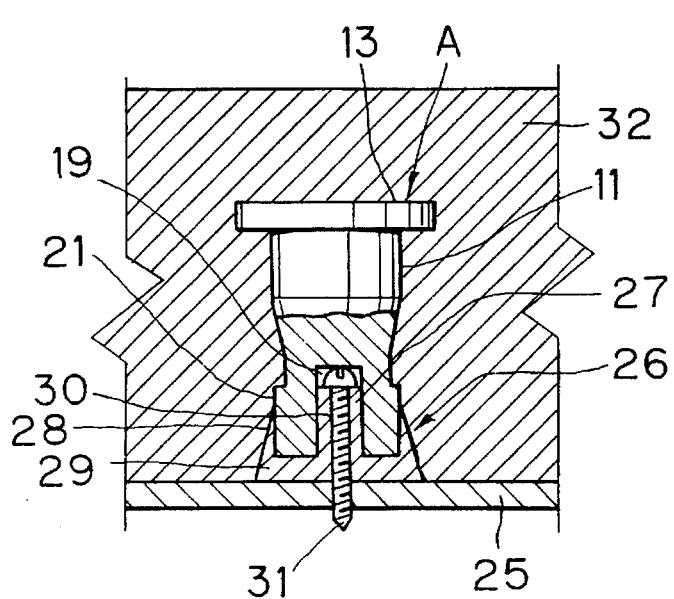
Figure 7:
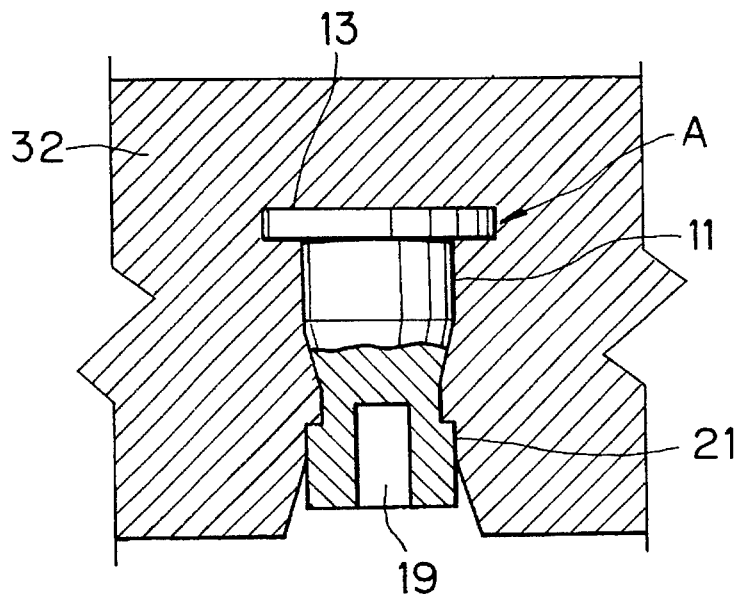

First, as shown in FIG. 4, the screw 31 passing through the through hole 30 of the supplimental member 26 is driven into the molded frame member 25 by a drill tool or the like. Next, as shown in FIG. 5, the lid body 13 of the ceiling insert A is driven with a hammer H making the hollow tube 27 engage with the lower hole 19 of the outer cylinder body 11. Thus, the ceiling insert A is mounted on the supplimental member 26. Then, as shown in FIG. 6, concrete 32 is casted. After solidation of the concrete 32, the molded frame member 25 is removed together with the supplimental member 26 fixed to the molded frame member 25. Therefore, as shown in FIG. 7, the ceiling insert A will be in the buried and fixed condition in the concrete 32. After that, next process will be to make the hanging bolt 18 engage with and fix to the ceiling insert A.

The kind of the supplimental member 26 can be selected according to condition of the mounting face.

The fixing process of hanging bolt 18 to the ceiling insert A and the functions of each member will be described in reference to FIG. 8 to FIG. 11.

Figure 8:
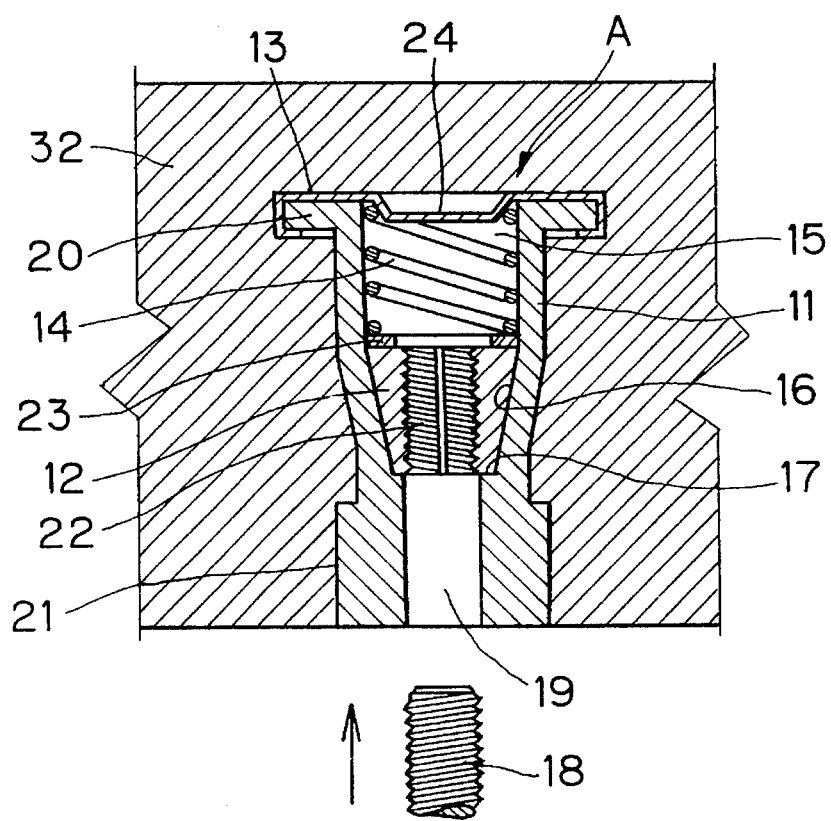
FIG. 8 to FIG. 11 are vertical sections showing process for fixing a hanging bolt in the ceiling insert by the insert which is buried and fixed in concrete.
Figure 9:
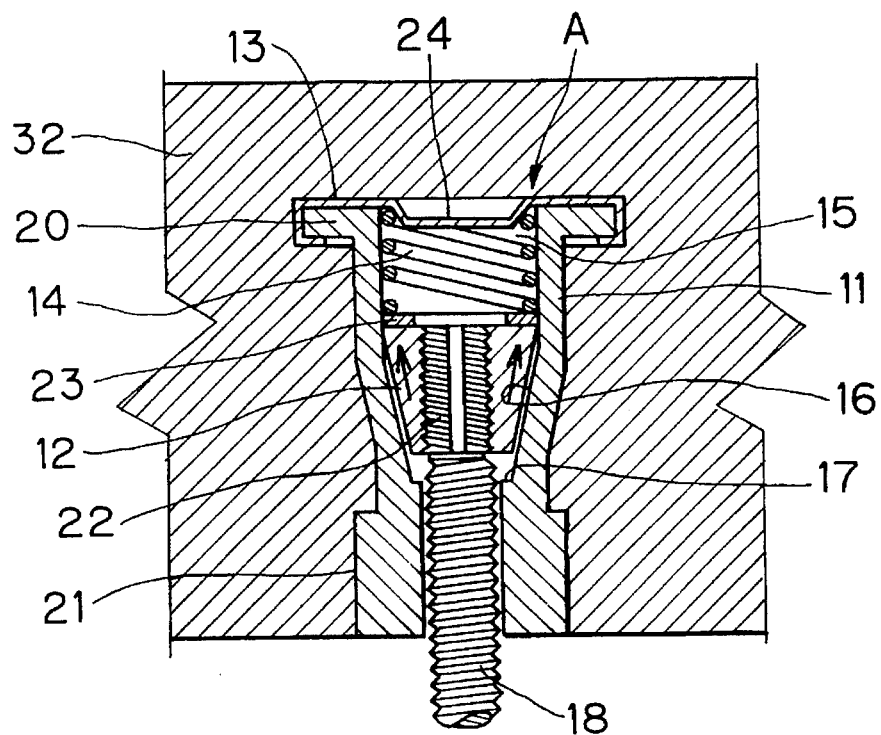

First, as shown in FIG. 8, the hanging bolt 18 is inserted upward from and through the lower hole 19 at lower part of the ceiling insert A buried and fixed inside the concrete 32. Next, as shown in FIG. 9, owing to the top end of the hanging bolt 18 pushed upward in the lower hole 19, the split nut 12 in the central hole 16 is pushed from the bottom as shown by arrows as it compresses the coil spring 14 along the inside-circumference wall face of tapered central or middle hole 16. The split nut spreads in horizontal directions, and this enable the hanging bolt 18 to move upward.

Figure 10:
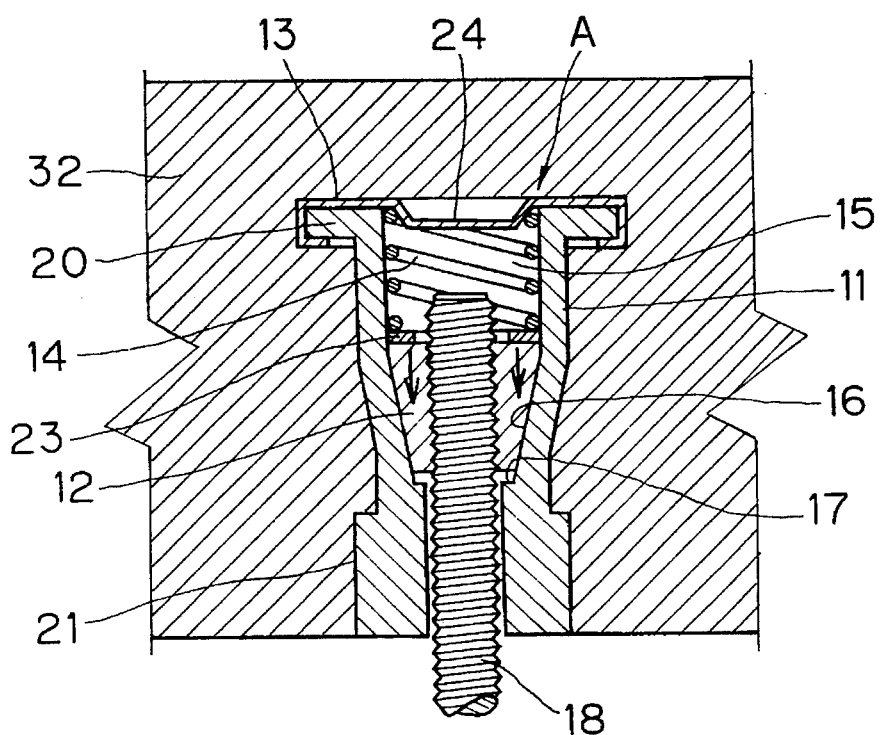
Figure 11:
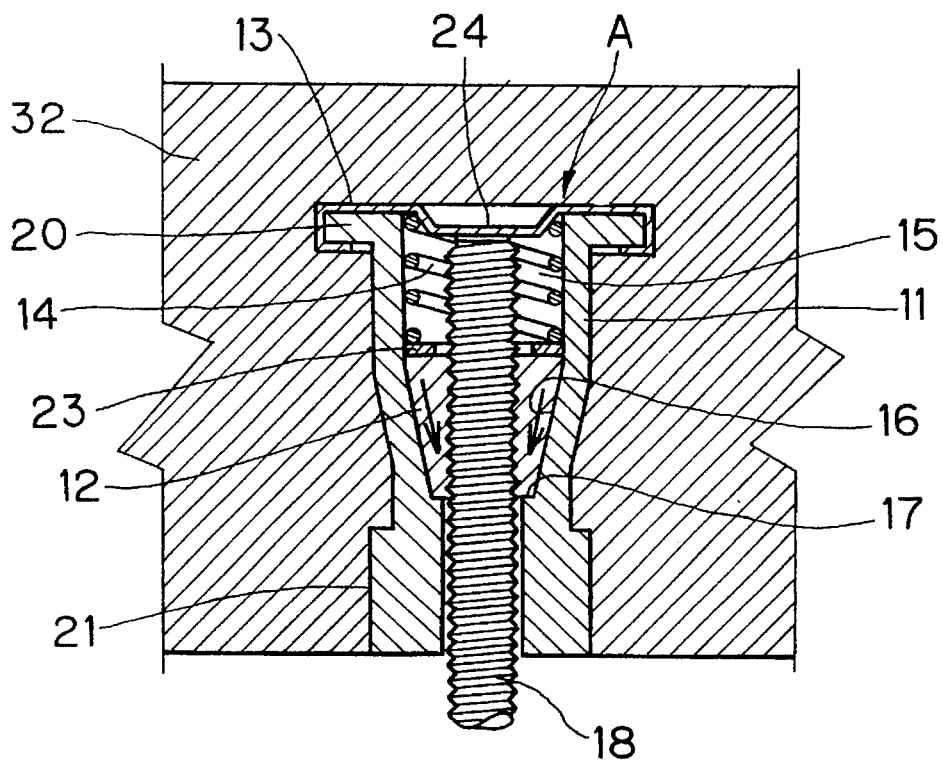
Figure 12:
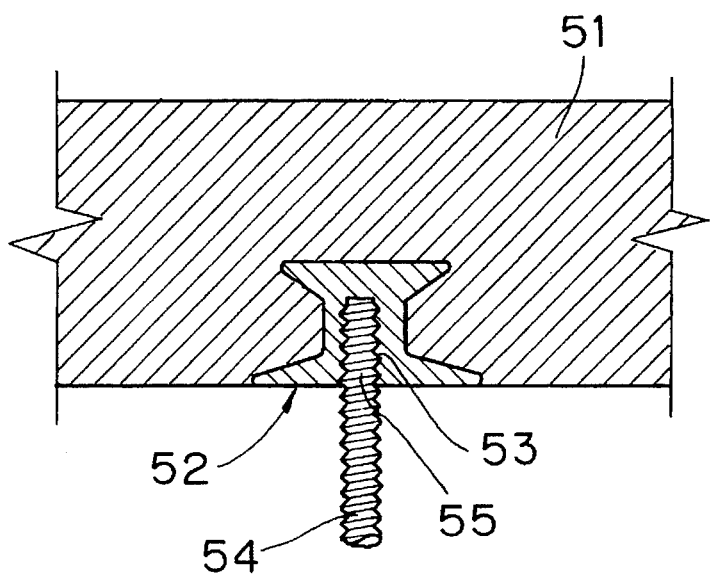
FIG. 12 is a vertical section showing the working condition of a conventional ceiling insert.

Then, as shown in FIG. 10, when the hanging bolt 18 is further pushed upward, the split nut 12 moves downward along and in contact with the outside circumference face of the hanging bolt 18 due to a elasticity of the coil spring 14. Last, as shown in FIG. 11, when the top end of the hanging bolt 18 contacts with the lower face of the lid body 13, the split nut 12 is squeezed by the tapered face of the lower hole 19, and has a higher pushing pressure in the inside direction as shown by arrows. The split nut 12 engages with the thread portion of the hanging bolt 18, thus the hanging bolt 18 is firmly fixed.

As described above, when the hanging bolt is mounted, the bolt is firmly fixed by merely inserting the top end of the hanging bolt into the lower hole and pushing it upward, and making the split nut engage with the thread portion. Therefore, it is not necessary to turn and thread the hanging bolt around its axis troublesomely. The bolt can be mounted simply, easily and rapidly. Resultantly, high working efficiency is achieved.

What is claimed is:

1. A ceiling insert in combination with a supplemental base member for locating the insert on a ceiling board while the insert is cast in concrete, the insert comprising an outer cylinder body having an upper hole of large diameter, a central hole below said upper hole having a taper such that the diameter of the central hole decreases downwardly away from the upper hole and having a step portion at a bottom end of the central hole, a straight lower hole below the step portion having a smooth inner surface and having a diameter less than the diameter of the bottom end of the central hole, said lower hole extending from the step portion through a lower end of the insert, a tapered split nut installed in the central hole of said outer cylinder body, a coil spring installed in the upper hole above the split nut, and a lid body as a cover fixed to a top end face of the outer cylinder body, wherein the coil spring is compressed by the lid body and the split nut and the split nut is urged downward by the coil spring against the step portion of the central hole, the supplemental base member comprising a continuous outer ring and a central tube defining an annular space therebetween for removably engaging a lower end of the insert with said central tube extending into the lower hole of the insert, the supplemental base member further including a screw extending downwardly within the central tube for securing the supplemental base member to the ceiling board.

2. The ceiling insert according to claim 1, further comprising a flange provided on a top end of the outer cylinder body, wherein the lid body is fixed to the flange.

3. The ceiling insert according to claim 1, wherein when the ceiling insert is embedded within a concrete ceiling the lower end of said insert is recessed from a surface of said concrete ceiling.

4. The ceiling insert according to claim 1, further comprising a depressed portion in a central portion of the lid body, said depressed portion extending within said upper hole of said outer cylindrical body and engages said coil spring.

5. The ceiling insert according to claim 1, wherein said tapered split nut is threaded, and further comprising a threaded hanging bolt threaded to said split nut and extending from said split nut to freely pass through and said lower hole.

6. The ceiling insert according to claim 1, wherein the outer ring of said supplemental base member tapers outwardly in a downward direction toward the ceiling board.

7. A ceiling insert in combination with a supplemental base member, the ceiling insert comprising an outer cylinder body having an upper hole, a tapered central hole located below the upper hole, wherein the diameter of the central hole decreases downwardly away from the upper hole, a tapered split nut installed in the central hole, a step portion located at a bottom end of the central hole, a straight lower hole located below the step portion having a smooth inner surface capable of guiding a threaded hanging bolt without obstruction to engage with the tapered split nut, wherein the supplemental base member comprising an outer ring and a central tube, the central tube insertable within the lower hole and removably engaging the inner surface of the lower hole.

8. The ceiling insert according to claim 7, wherein when the ceiling insert is embedded within a concrete ceiling such, that the lower end of said insert is recessed from a surface of said concrete ceiling.

9. The ceiling insert according to claim 7, wherein the outer ring of said supplemental base member tapers outwardly in a downward direction.

* * * * *